United States Patent
Dushatinski et al.

(10) Patent No.: US 11,362,400 B2
(45) Date of Patent: Jun. 14, 2022

(54) NANO-POROUS BNNT COMPOSITE WITH THERMAL SWITCHING FOR ADVANCED BATTERIES

(71) Applicant: BNNT, LLC, Newport News, VA (US)

(72) Inventors: Thomas G. Dushatinski, Chesapeake, VA (US); Gary S. Huvard, Chesterfield, VA (US); R. Roy Whitney, Newport News, VA (US); Kevin C. Jordan, Newport News, VA (US); Diego Pedrazzoli, Newport News, VA (US); Michael W. Smith, Newport News, VA (US); Jonathan C. Stevens, Williamsburg, VA (US)

(73) Assignee: BNNT, LLC, Newport News, VA (US)

( * ) Notice: Subject to any disclaimer, the term of this patent is extended or adjusted under 35 U.S.C. 154(b) by 208 days.

(21) Appl. No.: 16/074,978

(22) PCT Filed: Feb. 2, 2017

(86) PCT No.: PCT/US2017/016250
§ 371 (c)(1),
(2) Date: Aug. 2, 2018

(87) PCT Pub. No.: WO2017/136574
PCT Pub. Date: Aug. 10, 2017

(65) Prior Publication Data
US 2019/0123324 A1  Apr. 25, 2019

Related U.S. Application Data

(60) Provisional application No. 62/290,182, filed on Feb. 2, 2016, provisional application No. 62/427,506, filed on Nov. 29, 2016.

(51) Int. Cl.
*H01M 50/44* (2021.01)
*H01M 50/449* (2021.01)
(Continued)

(52) U.S. Cl.
CPC ......... *H01M 50/449* (2021.01); *H01M 10/05* (2013.01); *H01M 10/058* (2013.01);
(Continued)

(58) Field of Classification Search
CPC ............................. H01M 2/16; H01M 10/05
See application file for complete search history.

(56) References Cited

U.S. PATENT DOCUMENTS

| | | |
|---|---|---|
| 2008/0153959 A1 | 6/2008 | Charati et al. |
| 2013/0029242 A1* | 1/2013 | Mizuhata .......... H01M 8/04082 429/442 |

(Continued)

FOREIGN PATENT DOCUMENTS

| | | | |
|---|---|---|---|
| WO | WO 2014/197675 | 12/2014 | |
| WO | WO 2016/100715 | * 6/2016 | ............. C01B 35/14 |

OTHER PUBLICATIONS

International Search Report issued in International Appln. No. PCT/US17/16250 dated Apr. 14, 2017.
(Continued)

*Primary Examiner* — Jonathan Crepeau
*Assistant Examiner* — Angela J Martin
(74) *Attorney, Agent, or Firm* — Joshua B. Brady; Nixon & Vanderhye, P.C.

(57) ABSTRACT

Thermoresponsive composite switch (TRCS) membranes for ion batteries include a porous scaffolding providing ion channels and a thermoresponsive polymer coating. Boron nitride nanotube (BNNT)/polymer composite TRCS membrane embodiments are preferable due to unique BNNT properties. A BNNT scaffold coated with one or more polymers may form a composite separator with tunable porosity (porosity level and pore size distribution), composition, wettability, and superior electronic isolation, oxidative/reduction resistance, and mechanical strength. The
(Continued)

BNNT/polymer composite TRCS membrane optimizes the performance of ion batteries with tunable separator thicknesses that may be under 5 μm. Nano-scale porosity with thin separator thicknesses improves the charge density of the battery. Nano-scale architecture allows for reversible localized switching on the nano scale, in proximity to thermally stressed ion substrates. Polymer thermal expansion will decrease porosity at temperatures approaching the thermal runaway point. The BNNT polymers composite therefore functions as a TRCS.

23 Claims, 4 Drawing Sheets

(51) Int. Cl.
| | |
|---|---|
| *H01M 50/403* | (2021.01) |
| *H01M 50/411* | (2021.01) |
| *H01M 50/431* | (2021.01) |
| *H01M 50/446* | (2021.01) |
| *H01M 10/05* | (2010.01) |
| *H01M 10/058* | (2010.01) |

(52) U.S. Cl.
CPC ....... *H01M 50/403* (2021.01); *H01M 50/411* (2021.01); *H01M 50/431* (2021.01); *H01M 50/44* (2021.01); *H01M 50/446* (2021.01); *H01M 2200/10* (2013.01)

(56) References Cited

U.S. PATENT DOCUMENTS

2018/0348384 A1* 12/2018 Jordan ............... G01T 3/008
2019/0198418 A1*  6/2019 Whitney ............. C09K 5/14

OTHER PUBLICATIONS

International Preliminary Examination Report issued in International Appln. No. PCT/US17/16250 dated Jan. 29, 2018.

* cited by examiner ated on Aug. 10, 2017, claims benefit to U.S. Provisional Patent Application No. 62/290,182, filed Feb. 2, 2016, and U.S. Provisional Patent Application No. 62/427,506, filed Nov. 29, 2016. The contents of these applications are expressly incorporated by reference.

NANO-POROUS BNNT COMPOSITE WITH THERMAL SWITCHING FOR ADVANCED BATTERIES

CROSS REFERENCE TO RELATED APPLICATIONS

This application is a U.S. National Stage of PCT/US2017/016250, filed Feb. 2, 2017, now Published as WO 2017/136574 on Aug. 10, 2017, claims benefit to U.S. Provisional Patent Application No. 62/290,182, filed Feb. 2, 2016, and U.S. Provisional Patent Application No. 62/427,506, filed Nov. 29, 2016. The contents of these applications are expressly incorporated by reference.

STATEMENT REGARDING GOVERNMENT SUPPORT

None.

FIELD OF THE INVENTION

The present invention relates to ion battery separators comprising a porous scaffolding and a polymer coating, such as a boron nitride nanotube (BNNT) nano-porous scaffolding as supports for polymeric material and, in some embodiments, chemical modifying dopants, to produce a reversible locally thermoresponsive switching mechanism that prevents thermal runaway through sterically hindering ion flow.

BACKGROUND—INTRODUCTION

Battery technology requires further development to increase charge densities to the levels required for advanced batteries. Ion flow batteries of all types include an ion substrate separation membrane. Generally, the separation membrane in ion flow batteries is typically a porous electrospun or extruded olefin polymer-based sheet that provides a low-k dielectric membrane. Olefin membranes allow for cell polarization between cathode and anode materials because of their high porosity and non-polar electrostatic potentials. It should be noted that pseudocapacitance, polarization between electrode materials and separator, and polarization of the separator membrane, due to a dielectric constant, are also energy storage mechanisms being developed. However, these mechanisms add irregular discharge rates of the battery system. Olefin-based separator membranes also maintain sufficient structural integrity to prevent short circuiting at thicknesses >15 μm and have the chemical stability to resist degradation in the extreme redox ion battery environment. The chemical composition allows for free flow of cations and electrons without steric hindrances, and provides sufficient wettability of electrolyte solvent that increases ion mobility. A downfall of olefin separators is their lack of homogenous nanoscale porosity and a permanent shutdown mechanism: The structural integrity is created by impermeable micro-scale polymer architecture beneficial for films with thickness >15 μm.

Some battery separator membranes incorporate a tri-membrane irreversible safety mechanism consisting of a low melt temperature barrier encased in a higher melt temperature material. However, single membrane composites offer some advantage over multi-membrane films, including the tendency of multi-membrane films to delaminate and crack. The shut-down feature allows the encased low melt temperature material to fill pores in the solid high temperature laminating membranes during localized overheating from discharge. When this occurs, ion transport across the membrane is permanently sterically hindered in the effected section of the battery and the discharge rate declines enough to greatly reduce heat generation. This irreversible safety mechanism limits the lifetime of high discharge rate ion batteries. For example, tri-membrane polypropylene (PP) and polyethylene (PE), and single-membrane PE are used in some instances to form PP:PE:PP or PE separator membranes that harness PE's lower melting temperature to change morphology to become impermeable to ion flow. The melting points of PE and PP are 135° C. and 166° C. respectively, however select grades of PE have melting points above 160° C. Without the shutdown safety mechanism, a battery cell can undergo thermal runaway and ignite.

BRIEF SUMMARY

Described herein are embodiments of thermoresponsive composite electrode separator membranes for ion batteries. Embodiments of thermoresponsive composite electrode separator membranes for ion batteries may include a porous scaffolding that provides ion channels and a polymer coating that, upon reaching a threshold temperature, expands to reduce the average pore size, thereby locally reducing ion flow and lowering local temperature to prevent thermal failure in the battery. While various materials may be used to provide a porous scaffolding that provides ion channels (e.g., non-electrically conductive and chemically stable material in a coatable structure, such as a woven or non-woven mat, sheet, buckypaper, thin film, etc.), embodiments described herein generally use boron nitride nanotube (BNNT) scaffolding to take advantage of the unique properties of BNNTs. BNNT is an exceptional material for use as a porous scaffolding that provides ion channels, as it is non-electrically conductive, chemically stable, and may be formed in a variety of coatable structures, such as a woven or non-woven mat, sheet, buckypaper, thin film. The composite electrode separator membrane may have a BNNT scaffold and a polymer coating on the BNNT scaffold. Boron nitride nanotube scaffold may support the polymeric material, and in some cases a ceramic or glass material within the polymeric material, to form a composite separator membrane with tunable porosity (e.g., porosity level and pore size distribution), composition, wettability, dielectric strength, chemical resistance, and mechanical strength. BNNT polymer composite membranes optimize the performance of ion based batteries, and provide a separator membrane with a tunable thickness of <5 μm though the thickness may be thicker in some embodiments. The transition to nano-scale porosity with thinner separator thicknesses improves the charge density of the battery. Nanoscale architecture allows for reversible localized switching on the nano-scale, in proximity to thermally stressed ion substrates and solvent matrix. With the minimization to nano-scale architecture, thermal expansion will variably decrease porosity at temperatures approaching the thermal runaway point, providing increased steric hindrance for ion flow channels as temperature increases. The BNNT/polymer composite membranes therefore function as a thermoresponsive composite switch (TRCS). In other words, a BNNT-loaded battery separator performs as a TRCS by limiting current at abusive temperatures by constricting separator membrane pores (ion channels).

Embodiments of BNNT/polymer composite TRCS membranes may feature one or more enhancements. The thermal stability of PE bound to BNNT scaffolding in thin battery separator membranes can be adjusted by the addition of one or more of the following redox stable dopants: aluminum oxide, zirconia oxide, titanium oxide, yttrium oxide, silicates, or other metal oxides or ceramic oxides to allow for higher temperature functionality through enhancement of the polymer melting point (e.g., to select a specific temperature threshold above which the polymer will expand as described herein), below the thermal runaway temperature, as well as enhanced wettability from ion solvent. Doping with aluminum oxide (AlOx) specifically improves ion conductivity and increases separator wettability by a factor of 2. Doping polymeric materials with AlOx increases the abuse tolerance of separator membranes in batteries, maximizing the discharge rate while maintaining safe temperatures at doping ratios that increase the melting point of the polymer to below the thermal runaway temperature of the selected ion battery technology. Likewise, the thermal stability and mechanical properties (including an increase in elastic modulus) may be enhanced in poly(methyl methacrylate) battery separators by doping with BNNTs, and embodiments of BNNT/polymer composite membranes may include BNNT-doped poly(methyl methacrylate) or other BNNT-doped polymers. The pore sizes and overall porosity of the BNNT scaffolding surface coated with a polymer in some embodiments may be increased by incorporating sacrificial salt nanoparticle resists, stretching, other elongating mechanical processes and decreased through densification via calendaring, rolling, stretching, etc. Sacrificial salt nanoparticle resists in embodiments advantageously allows for desirable current limiting and mechanical properties in certain fabrication schemes.

The BNNT nano-filler when loaded into the polymeric coating increases mechanical strength and stiffness of the BNNT/polymer composite TRCS membrane and facilitates regimes for applied battery manufacturing. The result is decreased mass and volume of the separator membrane with improved strength, performance, and safety. The addition of BNNT to the membrane polymer provides enhanced thermal conductivity, thereby reducing or eliminating the risk of thermal runaway conditions through passive cooling perpendicular to the ion substrates.

Although persons of ordinary skill in the art will recognize that the polymer coating properties may vary depending on the particular embodiments, in some embodiments, the polymer coating supported by the BNNT scaffolding in BNNT/polymer composite TRCS membranes embodiments preferably has the following properties: thermal expansion coefficients >20 µm/m-K, working temperature >100° C., thermal conductivity >0.20 W/m-K, heat deformation resistance >75° C., and melting point >120° C. These properties may be achieved by optimizing the composition of the matrix, which may be, for example, a matrix of polymer/BNNT, BNNT/polymer, BNNT/polymer/ceramic, BNNT/polymer/glass, BNNT/polymer/glass/ceramic, BNNT/polymer/metal oxide, etc. When the current increases and creates local heating in a BNNT/polymer composite TRCS membrane, the expansion of the polymer coating on the BNNT scaffolding reduces the pore sizes. The resultant decreased porosity reduces the ion flow and allows for thermal stabilization of local ion flow. The ion current becomes sterically hindered, and the localized temperature does not approach the battery's runaway temperature (i.e., battery does not over heat). When the ion current decreases and the polymer coating cools, the polymer shrinks without damage and a concomitant restoration in current carrying capability of the battery occurs, functioning similarly to a proportional-integral-derivative controller, to maximize battery discharge safely. This type of variable current limiting switching mechanism is of particular benefit for batteries that have short duration, high current demands, as it allows for drastically enhanced cycling stability.

DESCRIPTION

Described herein are embodiments of a porous scaffold providing ion channels with a thermoresponsive polymer coating for TRCS membranes, such as BNNT/polymer composite TRCS membranes, that may function as a separator membrane, also referred to as a thermoresponsive composite electrode separator membrane, in an ion battery. Generally, embodiments of BNNT/polymer composite TRCS membranes include a BNNT scaffold and a polymer coating. BNNT/polymer composite TRCS membranes provide numerous benefits: tunable porosity (porosity level and pore size distribution), composition, wettability, and superior electronic isolation, oxidative/reduction resistance, and mechanical strength. As a result, BNNT/polymer composite TRCS membranes may be used in ion batteries to optimize the performance of ion batteries, with tunable separator thicknesses below 10 micrometers, and in some embodiments <5 µm. The transition to nano-scale porosity with separator thicknesses on the order of 5 µm will advantageously improve charge density of batteries.

Figure 1:
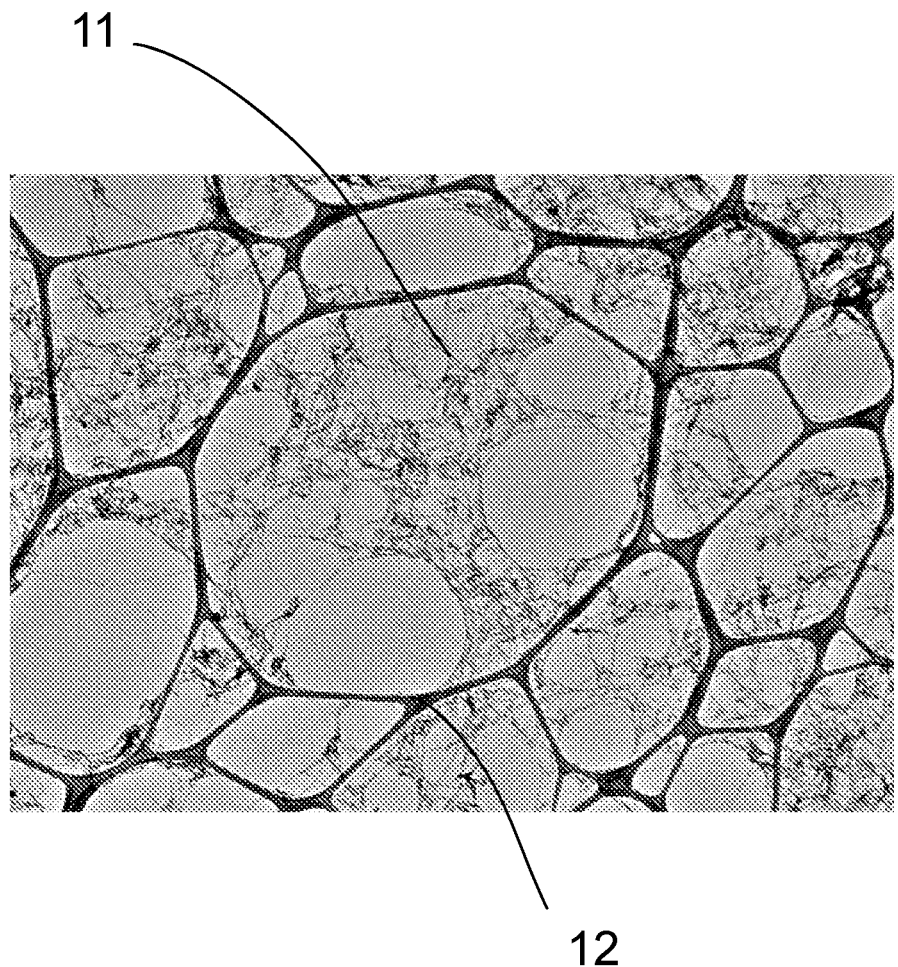
FIG. 1 shows a transmission electron microscope image (TEM) of as-synthesized BNNT material.

Boron nitride nanotubes 11, as shown in FIG. 1 deposited onto lacy carbon support grid 12 as required for the TEM, may be utilized as a scaffold for the polymeric coating material, and any dopants, forming a BNNT/polymer composite TRCS membrane. The nano-scale architecture of BNNT/polymer composite TRCS membranes makes reversible localized switching on the nano scale, in proximity to thermally stressed battery ion substrates. The reversible, localized switching capability of BNNT/polymer composite TRCS membranes is a novel feature for ion battery technology, and provides numerous advantageous benefits. With the nano-scale architecture, thermal expansion will decrease porosity at temperatures approaching the thermal runaway point for an ion battery system, thus functioning as a thermoresponsive composite switch (TRCS). In some embodiments, the preferred switching functionality will take place when the thermal expansion coefficient is >20 µm/m-K, working temperature >100° C., thermal conductivity >0.20 W/m-K, heat deformation resistance >75° C., and melting point >120° C. It should be appreciated, however, that persons of skill in the art may determine the desired parameters for switching functionality for a particular embodiment, and that those parameters may vary depending on the specific embodiment.

A variety of thermoresponsive polymers may be used in embodiments of TRCS membranes, such as BNNT/polymer composite TRCS membranes. Generally, thermoresponsive polymers have a linear thermal expansion coefficient in the range of about 20 µm/mK to about 200 µm/mK, though polymers with a linear thermal expansion coefficient above 200 µm/mK may be appropriate for certain embodiments. It should be appreciated that desired temperature operating range and average pore sizes may impact the preferred linear thermal expansion coefficient for a specific embodiment. Additionally, some embodiments may prefer a polymer with a high linear thermal expansion coefficient at or near the threshold switching temperature. Some embodiments may feature a single polymer, and other embodiments may feature a plurality of polymers. Poly-; cellulose acetate, ethylene/propylene copolymer, all variants of amide, acrylonitrile-butadiene-styrene, carbonate, etheretherketone, ethersulfone, epoxy, polyurethane, ethylene or propylene (ultra high molecular weight, high molecular weight, low molecular weight, and ultra low molecular weight (identified by high molecular weight hydrocarbons ranging from 10 carbon units to 100 s of carbon units that include paraffin waxes), ethylene terephthalate, methyl methacrylate, methylpentene, phenyleneoxide, styrene, sulphone, tetrafluoroethylene, vinylchloride, vinylidenefluoride, rubber, silicone elastomer, lactic acid, esters, and cellulose, and rayon, are examples of polymers that may be used in embodiments of TRCS membranes, such as BNNT/polymer composite TRCS membranes. In some embodiments, the polymer(s) may include dopants and polymer blends.

Figure 2:
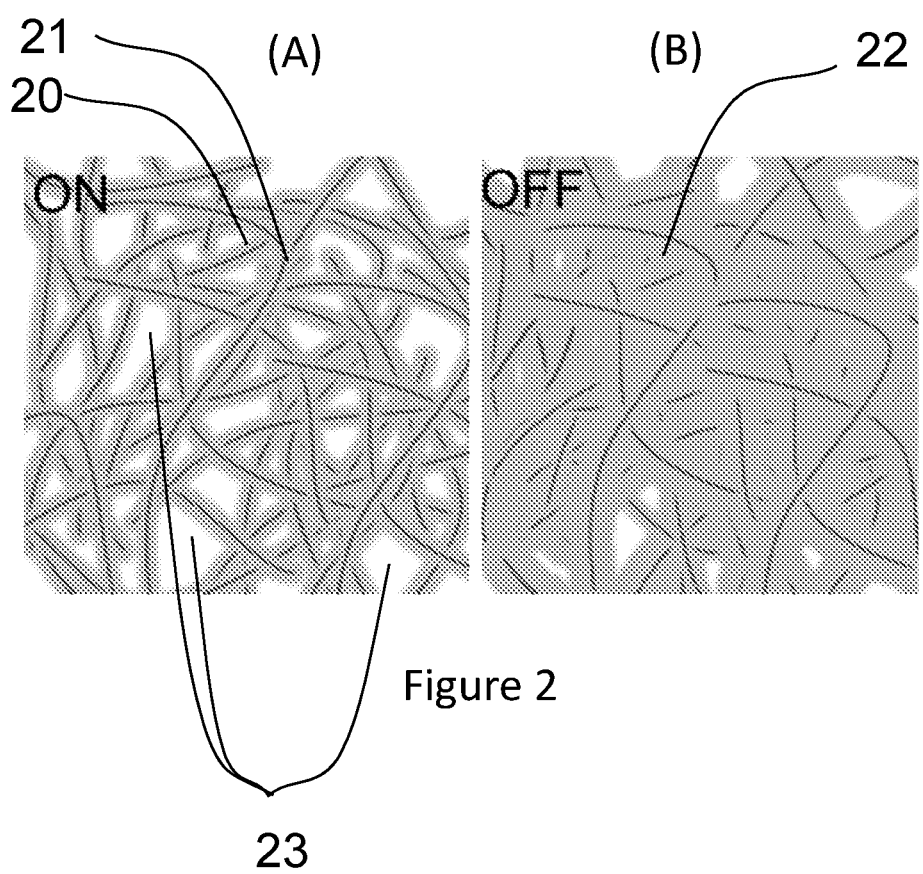
FIG. 2 illustrates (A) BNNTs coated with a polymer in an embodiment, and (B) the expansion of the polymer in the BNNT/polymer composite TRCS membrane due to heating.

FIG. 2 shows (A) BNNTs 21 coated with a polymer 20 in an embodiment, and (B) the expanded polymer 22 in the BNNT/polymer composite TRCS membrane due to heating. Ion channels 23 are present in the BNNT/polymer composite TRCS membrane. As illustrated in FIG. 2, one or more polymers 20 may be coated onto BNNT scaffold 21. When the polymer coating 20 experience excesses heat from excess ion currents flowing through the battery separator, the polymers expand to form expanded polymers 22, thereby restricting ion channel 23 diameter and associated average porosity of the composite sheet. As a result, the ion current and heating variably are hindered locally, maximizing controlled discharge rates.

Porous boron nitride nanotube (BNNT) scaffoldings 21 comprising polymer/BNNT composite have unprecedented mechanical, passive cooling, and chemical resistance properties lent by the electrically insulating, highly crystalline, and thermally conductive BNNTs. The high thermal conductivity of the BNNTs enhances the thermal conductivity and the stiffness of the BNNT enhances Young's modulus of the membranes. In addition, the thermal stability of the polymer coating can be further enhanced through the addition of AlOx and, in some embodiments, a binder. Doping the polymer coating with AlOx, or alternatively with a silicate, ceramic, or metal oxide as are known in the art, also improves ion conductivity and increases separator wettability. Furthermore, doping increases the abuse tolerance of separator membranes in batteries, maximizing the discharge while maintaining safe temperatures. Thus, embodiments may include a matrix of polymer/BNNT, BNNT/polymer, BNNT/polymer/ceramic, BNNT/polymer/glass, BNNT/polymer/glass/ceramic, BNNT/polymer/metal oxide, etc., such that the ceramic, glass, and/or metal oxide are embedded in the polymeric coating.

Figure 3:
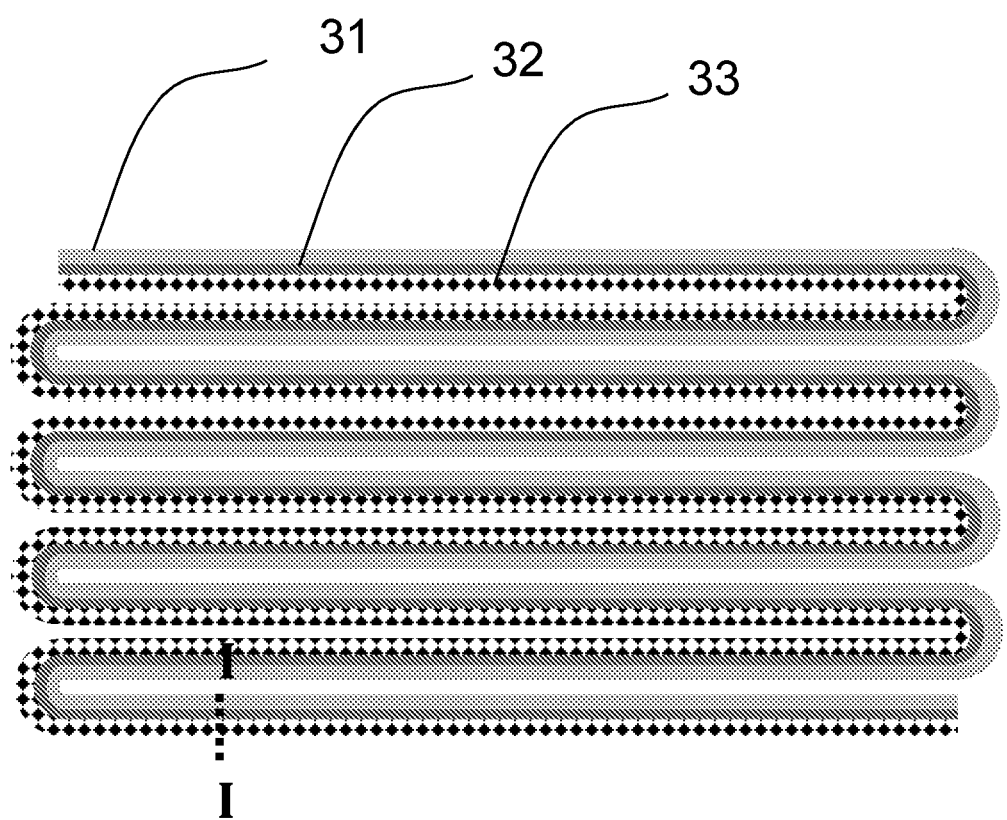
FIG. 3 illustrates an embodiment of a BNNT/polymer composite TRCS membrane between the anode membrane and cathode membrane.

FIG. 3 shows an embodiment of a BNNT/polymer composite TRCS membrane 32 in an ion battery. As illustrated in FIG. 3, the composite membrane or battery separator membrane 32 may be positioned between the anode 31 and cathode 33 membranes of the ion battery. In FIG. 3, the three membranes (anode 31, BNNT/polymer composite TRCS membrane 32, and cathode 33) are in turn folded to form a more compact system. In some embodiments, the membranes may be rolled together in a spiral shape, rather than folded as illustrated in FIG. 3. As one of ordinary skill will appreciate, there are multiple geometries for membranes that form an ion battery, and the present disclosure is not limited to a particular geometry. The benefit of having a battery separator membrane that has enhanced thermal conductivity properties is clear, as heat generated in the middle of the battery must propagate to the edges to be removed and thereby prevent thermal runaway conditions.

Figure 4:
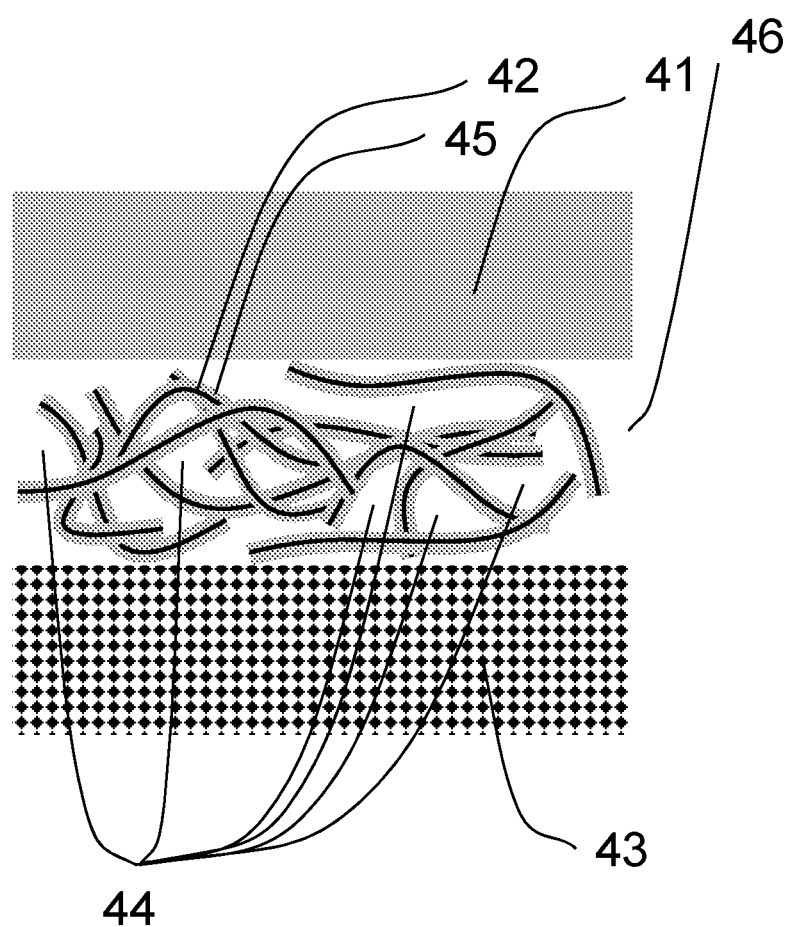
FIG. 4 shows a cross-section of an embodiment of a BNNT/polymer composite thermoresponsive electrode separator membrane in an ion battery.

FIG. 4 shows a cross-sectional view of an embodiment of a segment of an ion battery taken along I-I as indicated in FIG. 3. The cross-section shown in FIG. 4 is demonstrative of an ion battery featuring a thermoresponsive composite substrate separator membrane as described herein. The battery includes anode 41, thermoresponsive BNNT/polymer composite substrate separator membrane 46, and cathode 43. BNNT/polymer composite electrode separator membrane 46 includes a boron nitride nanotube scaffolding 42 with a polymer coating on the boron nitride nanotube scaffolding 45. Ion channels 44 are present throughout the boron nitride nanotube scaffolding 42 with a polymer coating 45. When the localized temperature of the BNNT/polymer composite electrode separator membrane 46 approaches the polymer coating's melting point, the polymer coating expands to reduce the average ion channel 44 diameter and associated average porosity of the BNNT/polymer composite electrode separator membrane 46. The polymer expansion reduces the ion current and heat generation locally. When the local temperature decreases, the polymer coating retracts, allowing the average ion channel 44 to return to its larger value. It should be appreciated that the polymer coating on BNNT scaffolding 42 may be formed from one or more polymers as described herein, and may include one or more dopants to achieve desired performance characteristics.

As one of ordinary skill in the art will appreciate, there are multiple methods for incorporating nanofillers, including BNNTs, into polymer composites, or similarly incorporating polymers into BNNT membranes and mats. Methods may be used to produce a nano-porous BNNT composite with thermal switching functionality for application as an advanced battery separator. A number of methods are described below, but it should be appreciated that there are additional methods for forming embodiments of the novel BNNT/polymer composite TRCS membrane.

Generally, the methods described herein relate to embodiments in which the scaffolding is a BNNT material, and therefore require a BNNT starting material, such as BNNT material available from BNNT, LLC (Newport News, Va.). Although any BNNT material may be considered for embodiments of the BNNT/polymer composite TRCS membrane, some forms of BNNT material may provide additional benefits. High quality and high purity BNNTs, defined by optimal crystallinity, few walls with a high aspect ratio (nano-tube length/nano-tube diameter), and low impurity content, boron, borates, and metals, and oxides, are known within the art. For example, U.S. patent application Ser. Nos. 14/529,485 and 15/305,994, International Patent Application PCT/US2016/023432, and U.S. Provisional Patent Application No. 62/427,506, describe various BNNT materials, and are incorporated by reference in their entirety. Purified BNNTs, and in particular BNNTs having >90% boron nitride, with an average tube diameter between 1.5 and 6 nanometers, consisting of between 1 to 10 concentric nanotubes, may be well-suited for use in BNNT/polymer composite TRCS membranes. There are also lower quality BNNT materials, typically with 10 s of walls and 10 s of nm in diameter with a lower level of crystallinity and aspect ratio, that may be used. However, depending on the BNNT synthesis process, the BNNT material may have undesirable properties. For example, some low quality BNNT material often has metallic impurities coming from the inclusion of $Li_2O$, or MgO catalyst utilized in the chemical vapor deposition (CVD) processes for synthesis of the low quality BNNT material. The lower qualities of BNNT material often have a relatively low surface area per unit mass, particle rather tubular character, and usually contains metal impurities. For these reasons, low quality BNNT may not be ideal for optimized BNNT/polymer composite TRCS membranes, but those of skill in the art may consider such materials as candidates for BNNT/polymer composite TRCS membranes. High quality BNNTs, such as those produced by certain high temperature methods, generally have few defects, no catalyst impurities, 1- to 10-walls with the peak in the distribution at 2-walls, and rapidly decreasing with larger number of walls. BNNT diameters typically range from 1.5 to 6 nm but may extend beyond this range, and lengths typically range from a few hundreds of nm to hundreds of micrometers but may extend beyond this range. For the as-produced high quality BNNT material produced by the high-temperature method, BNNTs typically make up about 50% of the bulk material and may have impurities of boron, amorphous boron nitride (a-BN) and hexagonal boron nitride (h-BN). These impurities for the as-produced BNNT material are typically 10 s of nm in size or less but may extend beyond this range.

Purification methods, such as those disclosed in U.S. Provisional Patent Application No. 62/427,506, filed Nov. 29, 2016 and incorporated by reference in its entirety, may be utilized to remove the impurities of boron and portions of the a-BN and h-BN. The purified BNNT may be utilized for as the initial BNNT material in methods for forming BNNT/polymer composite TRCS membranes described herein. Generally, methods for forming BNNT/polymer composite TRCS membranes include, but are not limited to, depositing the BNNTs out of solution via, e.g., a filtration process, spraying the BNNT solution onto a surface, freeze drying the BNNT solution on a surface, among others as may be known in the art. The exemplar methods disclosed herein may result in varying structural and chemical properties, and as a result may be used to optimize a BNNT/polymer composite TRCS membrane to meet the requirements of particular embodiments. The BNNT/polymer composite TRCS membrane may be tuned to thicknesses of about 10 µm, and in some embodiments less than 5 µm depending on specific battery requirements such as voltage and current required across the membranes of the batteries. These novel, unprecedented thicknesses for separators allow for pore size to surpass a nanoscale (<100 nm), while maintaining ion mobility. Considering the thickness of current battery separator membranes, on the order of about 10 µm to about 25 µm, incorporating the novel BNNT/polymer composite TRCS membranes into existing ion battery technologies provides enhancements to the lifetime of the battery system and improved passive thermal management. The following methods are examples of methods that may be used to synthesize BNNT/polymer thermoresponsive electrode separator membranes for ion batteries.

Method 1: Embodiments of this method may be used to form BNNT/polymer composite TRCS membranes. BNNT/poly-; cellulose acetate, ethylene/propylene copolymer, all variants of amide, acrylonitrile-butadiene-styrene, carbonate, etheretherketone, ethersulfone, epoxy, polyurethane, ethylene or propylene (including ultra high molecular weight, high molecular weight, low molecular weight, and ultra low molecular weight (identified by high molecular weight hydrocarbons ranging from 10 carbon units to 100 s of carbon units that include paraffin waxes)), ethylene terephthalate, methyl methacrylate, methylpentene, phenyleneoxide, styrene, sulphone, tetrafluoroethylene, vinylchloride, vinylidenefluoride, rubber, silicone elastomer, lactic acid, esters, and cellulose, rayon, and polyamic acid (pre-polyimide) TRCS films may be created by dispersing a BNNT material, and preferably a purified BNNT material, into a solvent, organic or aqueous corresponding to the solubility of the selected polymer or copolymer blend. Light sonication may be used to achieve a uniform dispersion. For example, polyamide copolymer, known in the trade as a "multi-nylon", is a type of nylon that is readily soluble in methanol and mixtures of methanol and water up to 20 percent by weight. A multi-nylon is sold by duPont under the tradename Elvamide and several multi-nylons are sold by Shakespeare. A solution of a multi-nylon may be prepared by mixing the polymer at up to about a 20 wt % in methanol while heating to about 50-60° C. A co-polymer solution may be formed by this method in about 1-2 hours. When a dissolute polymeric solution is obtained, water may be added to about 20 wt % based on solvent composition. The addition of water or ketones is known to increase the shelf life of multi-nylon solutions and to decrease a surface skinning effect upon blade and slot casting. Another example includes a dissolution of a variety of density qualities of polyethylene in xylene, toluene, trichlorobenzene, tetralin, or other high boiling point hydrocarbons. Upon dissolution at elevated temperatures above 100° C., which can range from 30 minutes to days depending on the density qualities of the PE, the solution can be mixed with BNNT dispersions in similar solvent or solvent preferred for casting techniques to attain smooth, homogenous surface characteristics.

The BNNT and nylon and BNNT and PE solutions may be combined, gently but thoroughly mixed, and poured, slot casted, spin coated, spray coated, filtered, wet-spun or electro-spun onto an anti-stick substrate or membrane. Those with experience within the art have knowledge of the wide variety of film casting applicators. The ratios of dispersed BNNT solution to dissolute polymeric solution (that in some embodiments contains one or more dopants as described herein) can be tuned to maintain an optimal porosity for mechanical post-processing of the membranes. The solvent or co-solvent may be evaporated to leave a multi-nylon/BNNT or PE/BNNT composite membrane. The melting temperatures of multi-nylons and PEs are significantly lower than those for polyamides such as Nylon 6 and Nylon 6,6. These polymers have melting temperatures of 220° C. and 265° C., respectively, compared to, for example, the melting temperature of Elvamide 8063 at 158° C. and polyethylene at 105° C. to 200° C. depending on quality. Although the melting temperature of the multi-nylon and PE is generally acceptable for battery application, there may be need for the higher melting temperature polyamides or PE/polyamide copolymers or doped polymer dissolutions.

Nylon 6 and Nylon 6,6 composites can be prepared in a similar fashion to the method described above for multi-nylons. The solvent may be changed from methanol to formic acid (98-100%) in order to form the nylon solutions. Formic acid has a boiling temperature and vapor pressure curve that is nearly the same as for water. Therefore, composite membranes can be obtained by the slow evaporation of formic acid after casting. Alternatively, a solvent exchange method using, for example, methanol, can be performed on a cast film composite in order to decrease the time needed to prepare the film. Such solvent exchange techniques are well-known in the art. In consideration of the wide variety of polymeric dissolutions, either functionalized variants of polymer, polymer/polymer, copolymer/dopant and polymer/dopant blends or solvent blends, can be used to surface modify the BNNT scaffolding and to create BNNT/polymer composite TRCS membranes.

Nylon's melting temperature (220° C. and 265° C. for Nylon 6 and Nylon 66, respectively) and thermal expansion coefficient, (90 μm/mK and 95 μm/mK) depend on the composition of Nylon 6 to Nylon 6,6. Annealing to bind nylon, multi-nylon or polyethylene etc. or doped variants to the BNNT support matrix can be optimized to increase polymer strength and to decrease porosity to a degree at which the thermal expansion coefficient of polymer is effective at constricting ion flow channels.

Method 2: Thermo-extrusion of a viscous BNNT/polymer composite master-batch containing a loading of BNNT between about 5% to about 75% through a die yields a preferable form factor for further thermo-mechanical and mechanical processes. Embodiments of this method may be used to form BNNT/polymer composite TRCS membranes. Extrusion of thermoplastics like polypropylene, methylated polyacrylate, polypropylene, polyethylene terephthalate and nylon, with subsequent compression molding, can produce films with thickness of about 50 μm. These films can be further processed to obtained desired porosities and thickness through calendaring, sizing stretching, and roll to roll stretching and combinations thereof to achieve desired properties. A master-batch may also incorporate sacrificial salt resists to be removed through solvation by subjecting the produced sheet to solvent. For example, inclusion of nanoscale sodium chloride in the master-batch will be dimensionally stable through the thermomechanical treatments to create thin sheets. Subjecting the thin sheet to water will dissolve the sodium chloride and reveal ion channels for percolation. Another example includes nano-wiskers of cellulose (3-30 nm in diameter) to the BNNT/polymer master-batch. After mechanical processing a basic solution containing low concentrations of sodium hydroxide, will dissolve the cellulose without affecting the polymer, revealing high aspect ratio channels that are optimal for TRCS.

Method 3: Rapid expansion of supercritical fluid solutions (RESS) is a technique used to fabricate polymer particles with high porosity, and embodiments may be used to generate BNNT/polymer composite TRCS membranes. The RESS method may be used for the co-deposition of BNNTs/polymer/salt or cellulose nano-wisker resist to form an impermeable membrane with tunable thickness and composition. Upon delamination from the deposition substrate, films are immersed in water or alkali solutions, thereby revealing nano-porosity through removal of imbedded resist material allowing for ion mobility. If porosity changes are needed beyond the scope of salt and cellulose removal, films are stretched or the polymer calendared to function best as TRCS and ion channels as described in Method 2. Additional embodiments may include one or more dopants such as glass or ceramic to the polymer, sacrificial resist and BNNT in the supercritical fluid solution that will allow for enhanced surface chemistry with the battery system. The membranes produced through this process may undergo further mechanical processing to attain the desired thickness and porosity parameters.

Method 4: Embodiments of this method utilize a BNNT-based fabrication path to form BNNT/polymer composite TRCS membranes. BNNT (and preferably purified BNNT) non-woven mats (e.g., BNNT buckypapers) may be produced through dispersion-based filtration deposition. The dispersions can be achieved utilizing a wide variety of solvents, for example methanol, chloroform, water/methanol cosolvent, isopropanol or dissolute polymer solutions as in Methods 1, 2 or 3 and then removing the solvent or polymer/solvent through chemical, thermal, ozone treatment, and/or high vacuum. Van der Waals attractions and localized polarity of the BNNTs hold the resultant BNNT non-woven mat together so it is structurally stable. The surface chemistry of a BNNT has demonstrated radical stabilizing, captodative, properties on two notable accounts. One, in a process that converted propane to propene while the localized polarity of the BNNT stabilized a hydrogenated oxygen and propene radical in a multistep dehydrogenation of propane, and two, in a process that allowed negatively charged amine radicals (amidogens) to adsorb onto the surface of the BNNT. Amidogenation is the process of using $NH_2$— radicals to functionalize or adsorb onto the surface of materials. The amidogenation and radical polymerization procedure proceeds as described. In a radio frequency ammonia plasma or other ammonia plasma (direct current (DC) or microwave) with acceleration of negatively charged $NH_2$— radicals towards the BNNT non-women mat by a DC field. Given the B-N repeating structure of the BNNT has captodative properties, radical amine groups are stabilized and adsorbed onto the chemically stable tube wall. After amidogenation, amidogens catalyze/initiate the polymerization of select polymers (with high thermal expansion coefficients) that bind the BNNT films. The propagation of polymer chains is terminated by contact with another amidogen; therefore concentrations of amine groups and monomer gas are tuned in the amidogenation and radical polymerization steps. It is known that the BNNT has captodative properties however there is novelty in utilizing these radical stabilizing substrates for polymerization of monomer gasses, specifically ethylene and propylene. Tunability through gas stoichiometry, concentration, mat density, and mechanical treatments creates films with high mechanical strength and porosity at minimal thicknesses to incorporate the TRCS mechanism. Furthermore, polystyrene, PMMA, and poly(vinyl acetate) free radicals may be substituted for physical vapor deposition of polymer material onto the BNNT non-woven mat with and without the amidogenation process or adsorption of other radical ions onto the B-N surface creating BNNT scaffold supported polymer materials. Out of respect for future technologies, a woven BNNT mat, with individual BNNT fibers of thicknesses less than 10 μm may be optimal substrates or supports for gas phase deposition of polymers (chemical vapor deposition).

Alternative embodiments may include the physical vapor deposition (PVD) of polyimide whereby depositing monomers, diamine and anhydride, onto a BNNT mat. Upon deposition within a high vacuum chamber ($<10^{-5}$ torr), condensation polymerization of the co-monomers to polyamic acid occurs at a temperature above 23° C. however can be increased to decrease sheet synthesis time. The BNNTs in the mat will be surface coated with polyamic acid after the initial polymerization. An imidization procedure will be utilized to further enhance the deposited polymer upgrading it from polyamic acid to polyimide. The imidization procedure requires chronothermostatic processes to control time and temperature of three temperature set points from 100° C. to 200° C. to 300° C. and variants about those temperatures that allow for imidization of the physical vapor deposited polyamic acid with tunable degrees of imidization.

Method 5: Metal catalysts are typically used in the polymerization process of olefins. To avoid the need for amidogenation step of Method 4, BNNT films from the first steps in Method 4 may be treated with olefin monomer gas with oxygen in a carrier gas. For example, the captodative properties of BNNT allow for radical initiation of polyethylene from ethylene gas, via a dehydrating oxygen radical at elevated temperature between 200° C. and 500° C. BNNT may also be optimal supports for precious metal catalysts for olefin polymerization. A solution-based method for surface treating tubes with uncapped precious metals and formation of a buckypaper will increase working surface area and be thermally stable at the polymerization temperature.

Although specific examples for synthesizing BNNT/polymer composite TRCS membranes have been disclosed, it should be appreciated that other methods may be used to form BNNT/polymer composite TRCS membranes. It should also be appreciated that other materials may be used to form a porous scaffolding for the polymer material. Such materials should be non-electrically conductive and chemically stable in a coatable structure, such as a woven or non-woven mat, sheet, buckypaper, thin film, etc. The scaffolding should provide ion channels for ion flow between the anode and cathode, such that thermal expansion of the polymer coating may reduce the average pore size and locally restrict ion flow and temperature, as described herein.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed is:

1. An ion battery thermoresponsive composite separator membrane comprising:
a porous boron nitride nanotube ("BNNT") scaffolding forming a BNNT separator membrane, the BNNTs providing BNNT ion channels and defining a plurality of pores in the BNNT separator membrane;
wherein the BNNTs in the scaffolding have a thermoresponsive polymer coating that expands at a threshold temperature to reduce the size of the pores, thereby locally reducing ion flow and lowering local temperature to prevent thermal failure;
and the BNNT separator membrane comprises a first side for contact with an anode, and a second side for contact with a cathode; such that a plurality of the BNNT ion channels extend between the anode to the cathode.

2. The ion battery separator membrane of claim 1, wherein the polymer coating comprises at least one of cellulose acetate, polyethylene, polypropylene, polyamide, acrylonitrile-butadiene-styrene, polycarbonate, polyether ether ketone, polyether sulfone, epoxy, polyurethane, polyethylene terephthalate, polymethyl methacrylate, polymethylpentene, polyphenylene oxide, polystyrene, polysulphone, polytetrafluoroethylene, polyvinylchloride, polyvinylidene fluoride, polyisoprene, silicone elastomer, polylactic acid, polyester, cellulose, rayon, and polyimide.

3. The ion battery separator membrane of claim 1, wherein the boron nitride nanotube scaffolding comprises at least one of a woven BNNT mat, a non-woven BNNT mat, a BNNT sheet, a BNNT buckypaper, and a thin BNNT film.

4. The ion battery separator membrane of claim 3, wherein the polymer coating comprises at least one of cellulose acetate, polyethylene, polypropylene, polyamide, acrylonitrile-butadiene-styrene, polycarbonate, polyether ether ketone, polyether sulfone, epoxy, polyurethane, polyethylene terephthalate, polymethyl methacrylate, polymethylpentene, polyphenylene oxide, polystyrene, polysulphone, polytetrafluoroethylene, polyvinylchloride, polyvinylidene fluoride, polyisoprene, silicone elastomer, polylactic acid, polyester, cellulose, rayon, and polyimide.

5. The ion battery separator membrane of claim 3, wherein the polymer coating is doped with boron nitride nanotubes.

6. The ion battery separator membrane of claim 3, wherein the polymer-coated BNNT scaffolding is at least one of calendared, stretched, or rolled, to enhance porosity.

7. The ion battery separator membrane of claim 3, wherein the polymer coating is doped with salt nanoparticle resists.

8. The ion battery separator membrane of claim 3, wherein the polymer coating is doped with at least one of aluminum oxide, zirconia oxide, titanium oxide, yttrium oxide, silicates, a metal oxide, and a ceramic oxide.

9. The ion battery separator membrane of claim 3, wherein the boron nitride nanotube scaffolding comprises a boron nitride nanotube material having less than 1 percent boron, less than 50% amorphous boron nitride, and less than 50% hexagonal boron nitride.

10. An ion battery comprising:
an anode;
a cathode;
a boron nitride nanotube ("BNNT") separator membrane comprising a porous ("BNNT") scaffolding providing a plurality of BNNT ion channels and defining a plurality of pores, the BNNTs having a thermoresponsive polymer coating, wherein the scaffolding comprises a first side for contact with the anode, and a second side for contact with the cathode; such that a plurality of the BNNT ion channels extend between the anode to the cathode; and
wherein the thermoresponsive polymer coating expands at a threshold temperature to reduce the size of the pores, thereby locally reducing ion flow and lowering local temperature to prevent thermal failure.

11. The ion battery of claim 10, wherein the boron nitride nanotube scaffolding comprises at least one of a woven BNNT mat, a non-woven BNNT mat, a BNNT sheet, a BNNT buckypaper, and a thin BNNT film.

12. The ion battery of claim 11, wherein the boron nitride nanotube scaffolding comprising a boron nitride nanotube material having less than 1 percent boron, less than 50% amorphous boron nitride, and less than 50% hexagonal boron nitride.

13. The ion battery of claim 11, wherein the polymer coating comprises at least one of cellulose acetate, polyethylene, polypropylene, polyamide, acrylonitrile-butadiene-styrene, polycabonate, polyether ether ketone, polyether sulfone, epoxy, polyurethane, polyethylene terephthalate, polymethyl methacrylate, polymethylpentene, polyphenylene oxide, polystyrene, polysulphone, polytetrafluoroethylene, polyvinylchloride, polyvinylidene fluoride, polyisoprene, silicone elastomer, polylactic acid, polyester, cellulose, rayon, and polyimide.

14. The ion battery of claim 11, wherein the polymer coating is doped with boron nitride nanotubes.

15. The ion battery of claim 11, wherein the polymer-coated BNNT scaffolding is at least one of calendared, stretched, or rolled, to enhance porosity.

16. The ion battery of claim 11, wherein the polymer coating is doped with salt nanoparticle resists.

17. The ion battery of claim 11, wherein the polymer coating is doped with at least one of aluminum oxide, zirconia oxide, titanium oxide, yttrium oxide, silicates, a metal oxide, and a ceramic oxide.

18. A method for minimizing thermal runaway in an ion battery comprising:
   positioning a thermoresponsive composite electrode separator membrane comprising a porous boron nitride nanotube ("BNNT") scaffolding providing BNNT ion channels and defining a plurality of pores wherein the boron nitride nanotubes have a thermoresponsive polymer coating, between an anode and a cathode in an ion battery; such that a plurality of the BNNT ion channels extend between the anode to the cathode;
   wherein the thermoresponsive polymer coating is a polymer that expands at a threshold temperature to reduce the size of the pores, thereby locally reducing ion flow and lowering local temperature to prevent thermal failure.

19. The method of claim 18, wherein the boron nitride nanotube scaffolding comprises at least one of a woven BNNT mat, a non-woven BNNT mat, a BNNT sheet, a BNNT sheet, a BNNT buckypaper, and a thin BNNT film.

20. The method of claim 19, wherein the polymer coating on boron nitride nanotubes expands when the ion battery electrode separator membrane temperature increases, reducing average coated boron nitride nanotube pore size and reducing the ion current.

21. The method of claim 19, wherein the polymer coating is doped with at least one of aluminum oxide, zirconia oxide, titanium oxide, yttrium oxide, silicates, a metal oxide, and a ceramic oxide.

22. The method of claim 19, wherein the polymer coating is doped with boron nitride nanotubes.

23. The method of claim 19, wherein the polymer coating comprises at least one of cellulose acetate, polyethylene, polypropylene, polyamide, acrylonitrile-butadiene-styrene, polycarbonate, polyether ether ketone, polyether sulfone, epoxy, polyurethane, polyethylene terephthalate, polymethyl methacrylate, polymethylpenetene, polyphenylene oxide, polystyrene, polysulphone, polytetrafluoroethylene, polyvinylchloride, polyvinylidene fluoride, polyisoprene, silicone elastomer, polylactic acid, polyester, cellulose, rayon, and polyimide.

* * * * *